US012654497B2

(12) United States Patent
Nakazaki

(10) Patent No.: US 12,654,497 B2
(45) Date of Patent: *Jun. 16, 2026

(54) PNEUMATIC TIRE

(71) Applicant: The Yokohama Rubber Co., LTD.,
Tokyo (JP)

(72) Inventor: Keisuke Nakazaki, Kanagawa (JP)

(73) Assignee: The Yokohama Rubber Co., LTD.,
Tokyo (JP)

( * ) Notice: Subject to any disclaimer, the term of this
patent is extended or adjusted under 35
U.S.C. 154(b) by 254 days.

This patent is subject to a terminal dis-
claimer.

(21) Appl. No.: 18/247,826

(22) PCT Filed: Sep. 7, 2021

(86) PCT No.: PCT/JP2021/032797
§ 371 (c)(1),
(2) Date: Apr. 4, 2023

(87) PCT Pub. No.: WO2022/074989
PCT Pub. Date: Apr. 14, 2022

(65) Prior Publication Data
US 2023/0415522 A1 Dec. 28, 2023

(30) Foreign Application Priority Data

Oct. 9, 2020 (JP) .................................. 2020-171224

(51) Int. Cl.
*B60C 19/12* (2006.01)
*B29C 73/16* (2006.01)
*B60C 1/00* (2006.01)
(52) U.S. Cl.
CPC ............ *B60C 19/12* (2013.01); *B29C 73/163*
(2013.01); *B60C 1/0008* (2013.01)

(58) Field of Classification Search
CPC ..... Y10T 152/10666; Y10T 152/10675; Y10T
152/10684; Y10T 152/10693; B60C
19/12; B60C 19/122
(Continued)

(56) References Cited

U.S. PATENT DOCUMENTS 4,064,922 A * 12/1977 Farber ..................... B29C 73/20
152/504 X
4,120,337 A * 10/1978 Soma ...................... B60C 19/12
152/504 X
(Continued)

FOREIGN PATENT DOCUMENTS

EP 3434730 A1 * 1/2019
JP 52-137803 A 11/1977
(Continued)

OTHER PUBLICATIONS

English machine translation of JP 2020-23152 A, Feb. 13, 2020.*
(Continued)

*Primary Examiner* — Adrienne C. Johnstone
(74) *Attorney, Agent, or Firm* — Thorpe North & Western

(57) ABSTRACT

In a pneumatic tire including belt layers on an outer cir-
cumferential side of a carcass layer in a tread portion and a
sealant layer made of an adhesive sealant provided on an
inner surface of the tread portion, a width SW of the sealant
layer, a width BW1 of an inner belt layer disposed adjacent
to the carcass layer of the belt layers, and an actual ground
contact width CW satisfy a relationship CW≤SW≤BW1.

18 Claims, 2 Drawing Sheets

(58) Field of Classification Search
USPC .................................. 152/502–504, 502–505
See application file for complete search history.

(56) References Cited

U.S. PATENT DOCUMENTS

| | | | | |
|---|---|---|---|---|
| 6,073,668 | A * | 6/2000 | Iwasaki | B60C 11/01 |
| | | | | 152/454 |
| 12,098,270 | B2 * | 9/2024 | Takahashi | B60C 19/122 |
| 2006/0194898 | A1 | 8/2006 | Sanda, Jr. | |
| 2015/0273944 | A1 * | 10/2015 | Yukawa | B60C 19/122 |
| 2018/0215903 | A1 * | 8/2018 | Kohl | B60C 19/122 |
| 2018/0281322 | A1 | 10/2018 | Dahlke et al. | |
| 2020/0156419 | A1 | 5/2020 | Zemla et al. | |
| 2020/0180367 | A1 * | 6/2020 | Seo | B60C 19/122 |
| 2020/0276736 | A1 * | 9/2020 | Hoshiba | B60C 19/122 |
| 2020/0290407 | A1 * | 9/2020 | Hoshino | B60C 19/122 |
| 2020/0290409 | A1 * | 9/2020 | Hoshino | B60C 19/122 |
| 2021/0009798 | A1 * | 1/2021 | Takahashi | B60C 19/122 |

FOREIGN PATENT DOCUMENTS

| | | | | |
|---|---|---|---|---|
| JP | 2006-152110 | A | | 6/2006 |
| JP | 2017061257 | A | * | 3/2017 |
| JP | 2018-69978 | A | | 5/2018 |
| JP | 2018075897 | A | * | 5/2018 |
| JP | 2018-525484 | A | | 9/2018 |
| JP | 2020-23152 | A | | 2/2020 |
| JP | 2020-515654 | A | | 5/2020 |
| JP | 2020-93776 | A | | 6/2020 |
| JP | 2020104606 | A | * | 7/2020 |
| JP | 2021-130348 | A | | 9/2021 |
| WO | WO-2017017080 | A1 | * | 2/2017 |
| WO | 2017/179576 | A1 | | 10/2017 |
| WO | WO-2019050030 | A1 | * | 3/2019 |
| WO | 2019/181414 | A1 | | 9/2019 |
| WO | 2019/181415 | A1 | | 9/2019 |

OTHER PUBLICATIONS

English translation of the Written Opinion of the International Searching Authority (PCT/ISA/237) for corresponding PCT/JP2021/032797 mailed Nov. 16, 2021.*

English machine translation of JP 2017-61257 A, Mar. 30, 2017.*

English machine translation of JP 2018-75897 A, May 17, 2018.*

English machine translation of JP 2020-104606-A, Jul. 9, 2020.*

* cited by examiner

PNEUMATIC TIRE

TECHNICAL FIELD

The present technology relates to a self-sealing type pneumatic tire including a sealant layer on a tire inner surface.

BACKGROUND ART

In a known pneumatic tire, a sealant layer is provided on an inner side in a tire radial direction of an innerliner layer in a tread portion (for example, see Japan Unexamined Patent Publication No. 2006-152110 A). In such a pneumatic tire, when a foreign matter such as a nail sticks into the tread portion, a sealant constituting the sealant layer flows into a through-hole made by the foreign matter. This can suppress a decrease in air pressure and maintain travel.

The self-sealing type pneumatic tire described above is expected to improve sealing properties in that the sealant easily flows into the through-hole when the viscosity of the sealant is low, but in a case where the sealant flows toward a tire center side due to the effects of heat and centrifugal force applied during travel, and as a result, the through-hole deviates from a tire center region, the sealant becomes insufficient, and sealing properties cannot be obtained sufficiently. On the other hand, when the viscosity of the sealant is high, a flow of the sealant described above can be prevented, but the sealant becomes difficult to flow into the through-hole, and the sealing properties may decrease. Thus, there is a demand that a sealant layer (sealant) provides a suppressed flow of a sealant associated with travel and good sealing properties in a well-balanced, compatible manner.

In addition, providing the sealant layer adds, as a result, a load corresponding to the sealant layer besides the tire main body, and the weight of the entire tire tends to increase. Accordingly, the self-sealing type pneumatic tire tends to have difficulty in maintaining good rolling resistance. Therefore, measures for suppressing an increase in tire weight and a degradation in rolling resistance while ensuring the performance as the sealant layer described above are awaited.

SUMMARY

The present technology provides a pneumatic tire that can suppress increases in tire weight and rolling resistance while ensuring good sealing properties and provide such performance in a well-balanced, compatible manner.

A pneumatic tire according to an embodiment of the present technology includes a tread portion extending in a tire circumferential direction and having an annular shape, a pair of sidewall portions respectively disposed on both sides of the tread portion, a pair of bead portions each disposed on an inner side of the pair of sidewall portions in a tire radial direction, a carcass layer mounted between the pair of bead portions, at least one belt layer including an inner belt layer disposed adjacent to an outer circumferential side of the carcass layer in the tread portion, and a sealant layer made of an adhesive sealant provided on at least an inner surface of the tread portion. In the pneumatic tire, a width SW of the sealant layer, a width BW1 of the inner belt layer, and an actual ground contact width CW satisfy a relationship CW≤SW≤BW1.

In providing the sealant layer on the inner surface of the tread portion, the pneumatic tire according to an embodiment of the present technology has the width SW of the sealant layer, the width BW1 of the inner belt layer, and the actual ground contact width CW satisfying the relationship CW≤SW≤BW1. This can suppress increases in tire weight and rolling resistance while ensuring sufficient sealing properties. That is, the range in which the sealant layer is provided (the width SW of the sealant layer) is equal to or greater than the actual ground contact width CW, allowing a region in which a through-hole may be formed to be sufficiently covered and good sealing properties to be ensured. On the other hand, the range in which the sealant layer is provided (the width SW of the sealant layer) is equal to or less than the width BW1 of the inner belt layer, allowing the amount of the sealant layer (adhesive sealant) to be added to the tire to be suppressed and increases in tire weight and rolling resistance to be suppressed.

In an embodiment of the present technology, preferably, the belt layer includes, in addition to the inner belt layer, an outer belt layer disposed adjacent to an outer circumferential side of the inner belt layer, and the width SW of the sealant layer and the width BW2 of the outer belt layer satisfy a relationship BW2≤SW. This further makes the width of the sealant layer proper, advantageously suppressing increases in tire weight and rolling resistance while ensuring sufficient sealing properties.

In an embodiment of the present technology, preferably, a vertical distance L along a tire radial direction between the tread surface at the tire equator position and the tread surface at the end portion of the actual ground contact region is 10.0 mm or less. This makes the profile of the tread portion flat and thus can suppress deformation of the sealant layer caused by ground contact deformation during travel.

In an embodiment of the present technology, the adhesive sealant preferably has tan δ at 60° C. of 1.0 or less. This improves the physical properties of the adhesive sealant, advantageously suppressing an increase in rolling resistance. Note that, "tan δ at 60° C." refers to a value measured in accordance with JIS (Japanese Industrial Standard) K6394 using a viscoelastic spectrometer under the conditions of a temperature of 60° C., an elongation strain rate of 10%±2%, and a vibration frequency of 20 Hz.

In an embodiment of the present technology, preferably, a thickness T1 of the tread portion and a thickness S1 of the sealant layer at the tire equator position satisfy a relationship $0.15 < S1/T1 < 0.35$, and a thickness T2 of the tread portion and a thickness S2 of the sealant layer at an end portion position of the sealant layer satisfy a relationship $0.20 < S2/T2 < 0.40$. Setting the thickness of the sealant layer in an appropriate range with respect to the thickness of the tread portion at each portion in the tire width direction (the tire equator position and the end portion position of the sealant layer) in this manner can suppress the flow of sealant during travel without impairing sealing properties. That is, the thickness of the tread portion influences deformability of the tire, and the sealant is more likely to flow during travel as the tire is more deformable, and thus setting the ratio of the thickness of the tread portion to the thickness of the sealant layer in an appropriate range allows the flow during travel to be suppressed.

In an embodiment of the present technology, in a sealant composition constituting the adhesive sealant (hereinafter, referred to as sealant composition of the present technology), a proportion A of toluene insoluble in the sealant composition expressed by Equation (1) below preferably ranges from 30 mass % to 60 mass %. This can achieve adequate crosslinking density and ensure suitable physical properties (low fluidity and excellent sealing properties) as a sealant material.

$$A = (W2/W1) \times 100 \qquad (1)$$

where W2 is a mass (unit: g) of toluene insoluble remaining after immersion of the sealant composition in toluene for one week, and W1 is an initial mass (unit: g) before immersion of the sealant composition in toluene.

The sealant composition according to an embodiment of the present technology preferably includes from 0.1 parts by mass to 40 parts by mass of a crosslinking agent blended per 100 parts by mass of a rubber component. Crosslinking by using an adequate content of the crosslinking agent in this manner obtains adequate elasticity that does not cause a flow during travel while ensuring viscosity sufficient to obtain good sealing properties, advantageously providing such performance in a well-balanced, compatible manner.

In the sealant composition according to an embodiment of the present technology, the crosslinking agent preferably includes a sulfur component. This increases reactivity of the rubber component (for example, butyl rubber) and the crosslinking agent and can improve the processability of the sealant composition.

In the sealant composition according to an embodiment of the present technology, the rubber component preferably includes butyl rubber, and a blended amount of the butyl rubber per 100 mass % of the rubber component is preferably 10 mass % or more. Further, the butyl rubber preferably includes chlorinated butyl rubber, and a blended amount of the chlorinated butyl rubber per 100 mass % of the rubber component is preferably 5 mass % or more. Such a blend can improve adhesiveness with respect to the tire inner surface.

In the sealant composition according to an embodiment of the present technology, from 1 part by mass to 40 parts by mass of an organic peroxide and more than 0 parts by mass and less than 1 part by mass of a crosslinking aid are preferably blended per 100 parts by mass of the rubber component. Crosslinking by using the organic peroxide and the crosslinking aid in combination in this manner obtains adequate elasticity that does not cause a flow during travel or storage while ensuring viscosity sufficient to obtain good sealing properties, advantageously providing such performance in a well-balanced, compatible manner.

In the present technology, "the width SW of the sealant layer" refers to the average value of the widths measured at any eight locations on the tire circumference, and the widths at any eight locations are the distances along the tire width direction in a region where the thickness of the sealant layer is 2 mm or more at each location. "Actual ground contact width CW" refers to the ground contact width in the tire axial direction measured when the tire is mounted on a regular rim described below and inflated to an air pressure of 230 kPa, and placed vertically upon a flat surface with a load corresponding to 70% of a regular load described below applied thereto. Each of the "width BW1 of the inner belt layer" and the "width BW2 of the outer belt layer" is an average value of widths measured in cut cross-sections at any eight locations on the tire circumference.

In addition, the "vertical distance L" is specified based on a tire shape in an unloaded state in which the tire is mounted on a regular rim described below and inflated to a regular internal pressure described below. Similarly, the "thickness T1", the "thickness S1", the "thickness T2", and the "thickness S2" are specified based on a tire shape in an unloaded state in which the tire is mounted on a regular rim described below and inflated to a regular internal pressure described below. All of the "thickness T1", the "thickness S1", the "thickness T2", and the "thickness S2" are values measured along a normal line of a carcass line (a contour line of a surface on the outer circumferential side of a carcass layer in a meridian cross-section). Specifically, the "thickness T1" and the "thickness S1" are the thicknesses of, respectively, the tread portion and the sealant layer measured along the normal line of the carcass line (basically coincident with the tire equator) passing through the intersection point of the carcass line and the tire equator. The "thickness T2" and the "thickness S2" are thicknesses of, respectively, the tread portion and the sealant layer measured along the normal line of the carcass line passing through an end portion of the sealant layer (end point when measuring the width SW of the sealant layer).

In the present technology, "regular rim" is a rim defined by a standard for each tire according to a system of standards that includes standards with which tires comply, and refers to, for example, a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). In the system of standards, including standards with which tires comply, "regular internal pressure" is air pressure defined by each of the standards for each tire and refers to "maximum air pressure" in the case of JATMA, the maximum value being listed in the table "TIRE LOAD LIMITS AT VARIOUS COLD INFLATION PRESSURES" in the case of TRA, or "INFLATION PRESSURE" in the case of ETRTO. However, "regular internal pressure" is 180 kPa in a case where a tire is for a passenger vehicle. "Regular load" is a load defined by a standard for each tire according to a system of standards that includes standards with which tires comply, and refers to a "maximum load capacity" in the case of JATMA, the maximum value being listed in the table of "TIRE LOAD LIMITS AT VARIOUS COLD INFLATION PRESSURES" in the case of TRA, or "LOAD CAPACITY" in the case of ETRTO. "Regular load" corresponds to 88% of the loads described above in a case where a tire is for a passenger vehicle.

DETAILED DESCRIPTION

Configurations of embodiments of the present technology will be described in detail below with reference to the accompanying drawings.

Figure 1:
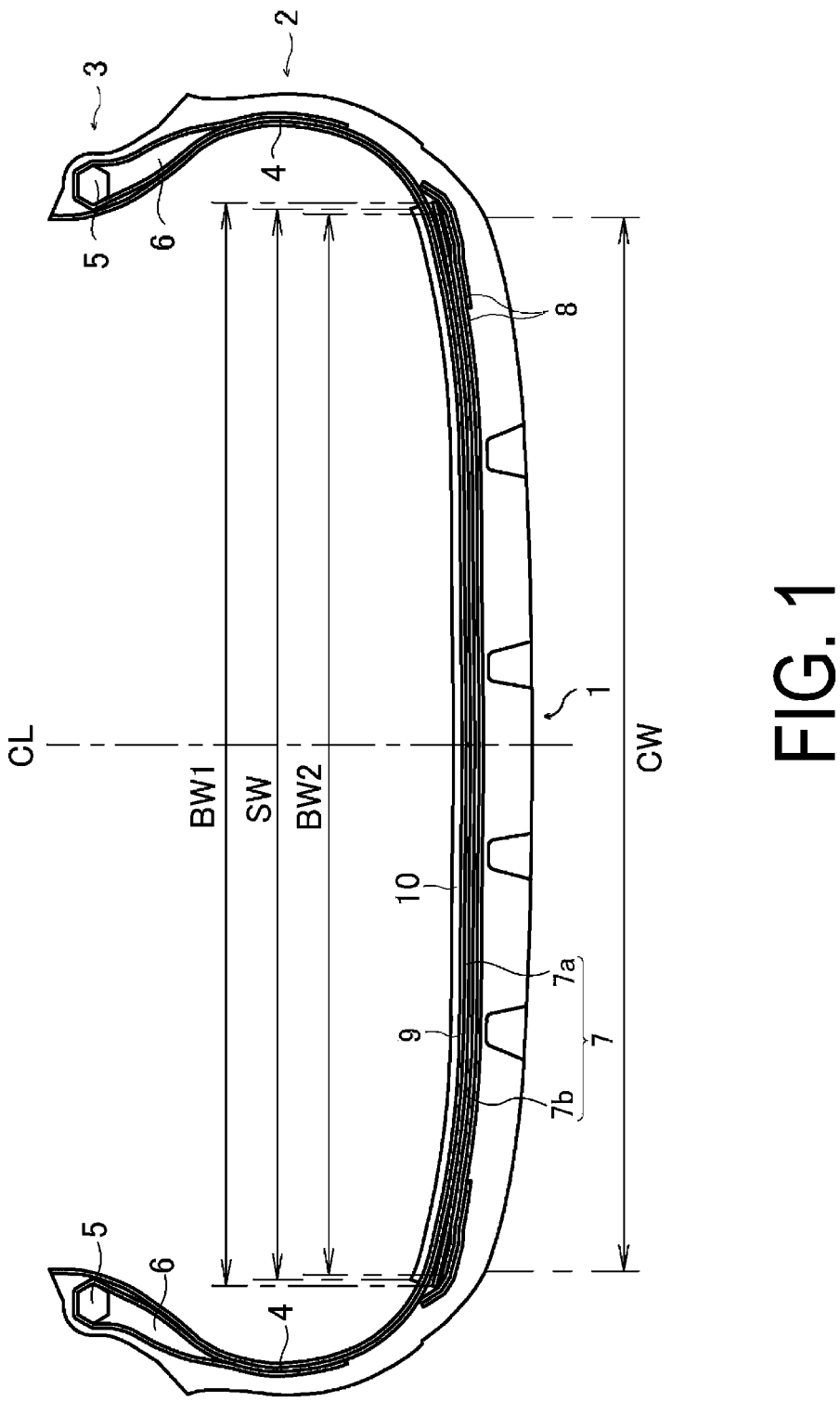
FIG. 1 is a meridian cross-sectional view illustrating an example of a pneumatic tire of an embodiment of the present technology.
Figure 2:
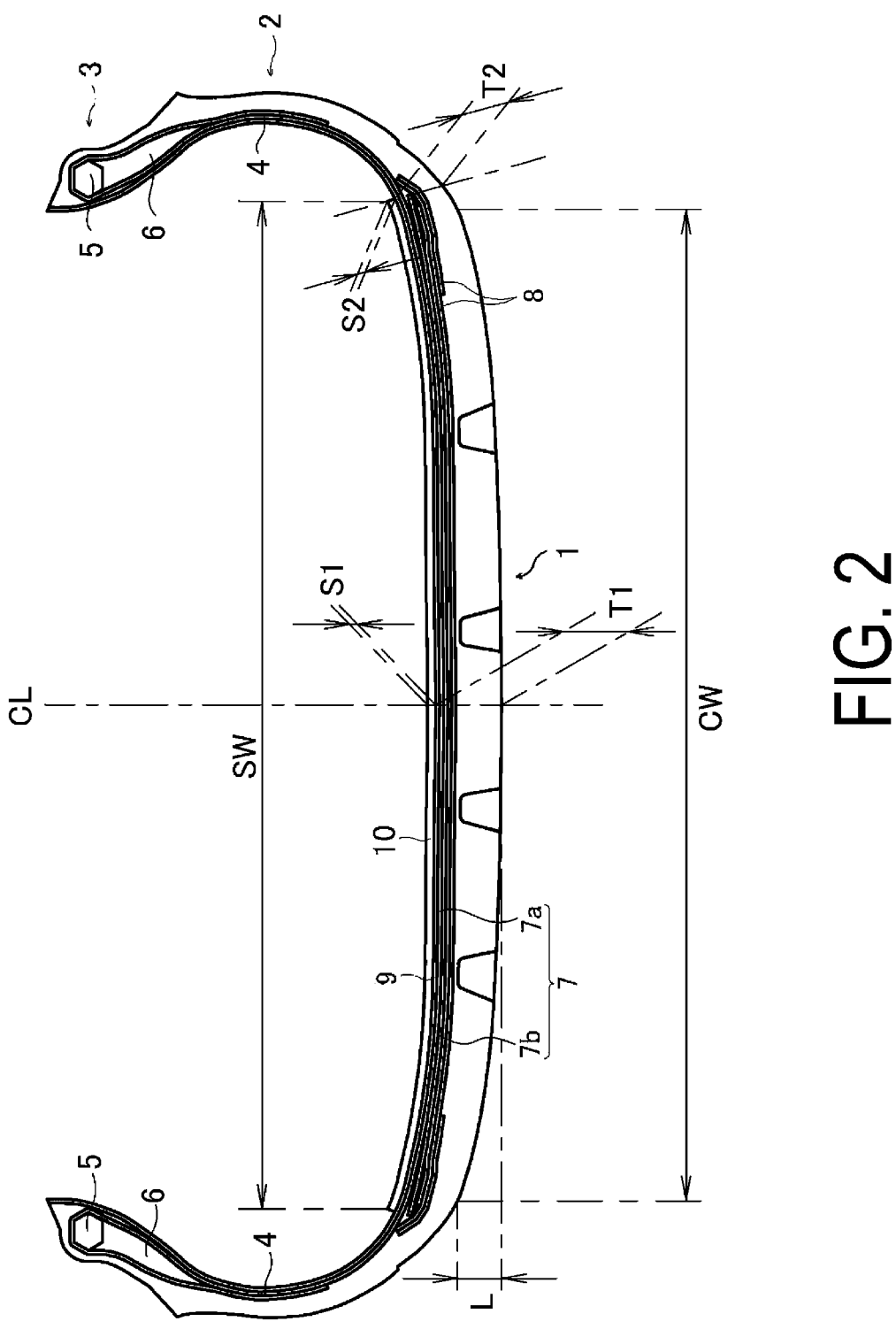
FIG. 2 is a meridian cross-sectional view illustrating an example of a pneumatic tire of an embodiment of the present technology.

As illustrated in FIGS. 1 and 2, for example, a pneumatic tire (self-sealing type pneumatic tire) of an embodiment of the present technology includes a tread portion 1 extending in a tire circumferential direction and having an annular shape, a pair of sidewall portions 2 disposed on both sides of the tread portion 1, and a pair of bead portions 3 disposed on an inner side in a tire radial direction of the sidewall portions 2. Note that "CL" in FIGS. 1 and 2 denotes a tire equator. FIGS. 1 and 2, which are meridian cross-sectional views, are not illustrated. the tread portion 1, the sidewall portions 2, and the bead portions 3 each extend in the tire circumferential direction and have an annular shape. This configures the basic structure in a toroidal shape of the pneumatic tire. Other tire components in the meridian cross-sectional view also extend in the tire circumferential direction to form annular shapes unless otherwise indicated.

In the example of FIGS. 1 and 2, a carcass layer 4 is mounted between the pair of bead portions 3 of left and right. The carcass layer 4 includes a plurality of reinforcing cords extending in the tire radial direction, and is folded back around a bead core 5 and a bead filler 6 disposed in each of the bead portions 3 from a vehicle inner side to a vehicle outer side. Additionally, the bead filler 6 is disposed on an outer circumferential side of the bead core 5, and the bead filler 6 is enveloped by a body portion and a folded back portion of the carcass layer 4.

At least one belt layer 7 is embedded on the outer circumferential side of the carcass layer 4 in the tread portion 1. The belt layer 7 necessarily includes an inner belt layer 7a disposed adjacent to the outer circumferential side of the carcass layer, and an outer belt layer 7b disposed adjacent to the outer circumferential side of the inner belt layer 7a can be optionally provided as in the illustrated example. Each belt layer 7 (inner belt layer 7a or outer belt layer 7b) includes a plurality of reinforcing cords that are inclined with respect to the tire circumferential direction, and the reinforcing cords are disposed between layers intersecting with each other. In these belt layers 7, the inclination angle of the reinforcing cords with respect to the tire circumferential direction is set in a range of, for example, from 10° to 40°. A belt reinforcing layer 8 is provided on an outer circumferential side of the belt layers 7 in the tread portion 1. In the illustrated example, the belt reinforcing layer 8 is provided including two layers of a full cover layer covering the entire width of the belt layer 7 and an edge cover layer disposed further on an outer circumferential side than the full cover layer and covering only an end portion of the belt layer 7. The belt reinforcing layer 8 includes an organic fiber cord oriented in the tire circumferential direction, and an angle of the organic fiber cord with respect to the tire circumferential direction is set to, for example, from 0° to 5°.

On a tire inner surface, an innerliner layer 9 is provided along the carcass layer 4. The innerliner layer 9 is a layer for preventing air in the tire from permeating outside the tire. The innerliner layer 9 includes, for example, a rubber composition including, as a main component, butyl rubber having air permeation preventing performance. Alternatively, the innerliner 9 can also include a resin layer including a thermoplastic resin as a matrix. In the case of the resin layer, a resin layer including an elastomer component dispersed in a matrix of a thermoplastic resin may be used.

As illustrated in FIG. 1, a sealant layer 10 is provided on an inner side in the tire radial direction of the innerliner layer 9 in the tread portion 1. The sealant layer 10 is a layer attached to the inner surface of the pneumatic tire including the basic structure described above, and for example, when a foreign matter such as a nail sticks into the tread portion 1, an adhesive sealant constituting the sealant layer 10 flows into a through-hole made by the foreign matter and seals the through-hole, and accordingly, a decrease in air pressure can be suppressed and travel can be maintained.

The sealant layer 10 has a thickness of, for example, from 2.0 mm to 5.0 mm. Having such degree of thickness can suppress a flow of a sealant during travel while ensuring good sealing properties. Additionally, good processability at the time of attaching the sealant layer 10 to the tire inner surface is also obtained. When the thickness of the sealant layer 10 is less than 2.0 mm, it becomes difficult to ensure sufficient sealing properties. When the thickness of the sealant layer 10 exceeds 5.0 mm, tire weight increases and rolling resistance degrades. Note that "the thickness of the sealant layer 10" here refers to the average thickness.

The sealant layer 10 can be formed by attaching later the sealant layer 10 to the inner surface of the vulcanized pneumatic tire. For example, the sealant layer 10 can be formed by attaching an adhesive sealant including the sealant composition described below and molded in a sheet shape to the entire circumference of the tire inner surface, or by spirally attaching an adhesive sealant including the sealant composition described below and molded in a string-like shape or a band-like shape to the tire inner surface. Here, a crosslinked adhesive sealant is preferably used. That is, the adhesive sealant that has been cross-linked in advance is less likely to deform, and thus deformation and flow associated with travel are less likely to occur even after placed on the tire inner surface as the sealant layer 10.

In providing the sealant layer 10 in this manner, in an embodiment of the present technology, the sealant layer 10 is disposed such that the width SW of the sealant layer 10, the width BW1 of the inner belt layer 7a, and the actual ground contact width CW satisfy the relationship CW≤SW≤BW1.

Accordingly, the range in which the sealant layer 10 is provided (the width SW of the sealant layer 10) has a breadth equal to or greater than the actual ground contact width CW. This can sufficiently cover a region in which a through hole may be formed and ensure good sealing properties. On the other hand, the range in which the sealant layer 10 is provided (the width SW of the sealant layer 10) is equal to or less than the width BW1 of the inner belt layer 7a. This can suppress the amount of the sealant layer 10 (adhesive sealant) added to the tire and suppress increases in tire weight and rolling resistance.

When the belt layer 7 includes the inner belt layer 7a and the outer belt layer 7b as in the illustrated example, the width SW of the sealant layer 10 and the width BW2 of the outer belt layer 7b preferably satisfy the relationship BW2<SW. This further makes the width of the sealant layer 10 proper, advantageously suppressing increases in tire weight and rolling resistance while ensuring sufficient sealing properties. More preferably, the width SW of the sealant layer 10, the width BW1 of the inner belt layer 7a, the width BW2 of the outer belt layer 7b, and the actual ground contact width CW satisfy the relationship CW≤BW2<SW≤BW1. In addition, as described above, the width SW of the sealant layer 10 is specified based on a region in which the thickness of the sealant layer 10 is 2 mm or more, and thus there is a possibility that a portion where the thickness of the sealant layer 10 is less than 2 mm is present at an end portion of the sealant layer 10, but even when a portion where the thickness of the sealant layer 10 is less than 2 mm is present at an end portion of the sealant layer 10, preferably, the entire sealant layer 10 including a portion where the thickness of the sealant layer 10 is less than 2 mm is present on the inner side in the tire width direction than end portions of the inner belt layer 7a.

Since the sealant layer 10 is provided on the tire inner surface as described above, it tends to be easily affected by deformation of the tire during travel. Therefore, a vertical distance L along the tire radial direction between the tread surface at the position of the tire equator CL and the tread surface at the end portion of the actual ground contact region (position of the end point when the actual ground contact width CW is measured) is preferably set to 10.0 mm or less. This makes the profile of the tread portion 1 flat and thus suppresses a change in tire shape between the unloaded state and during travel (upon ground contact) and can suppress deformation of the sealant layer 10 caused by the ground contact deformation during travel. Here, when the vertical distance L exceeds 10.0 mm, the deformation of the sealant layer 10 cannot be sufficiently suppressed, which has a risk of affecting the sealing properties. Note that, since the vertical distance L fluctuates depending on the tire size, the lower limit thereof is not particularly limited, but can be set to, for example, 3.0 mm.

As illustrated, provided that the thickness of tread portion 1 at the position of the tire equator CL is T1, the thickness of the sealant layer 10 at the position of the tire equator CL is S1, the thickness of the tread portion 1 at the end portion position of the sealant layer 10 is T2, and the thickness of the sealant layer 10 at the end portion position of the sealant layer 10 is S2, preferably, the thicknesses T1 and S1 satisfy the relationship 0.15<S1/T1<0.35, and the thicknesses T2 and S2 satisfy the relationship 0.20<S2/T2<0.40. By setting the thickness of the sealant layer 10 in an appropriate range with respect to the thickness of the tread portion 1 in each portion (the position of the tire equator CL and the end portion position of the sealant layer 10) as described above, the flow of sealant during travel can be suppressed without impairing the sealing properties. That is, since the thickness of the tread portion 1 influences deformability of the tire, and the sealant layer 10 is more likely to deform or flow during travel as the tire is more deformable, setting the ratio of the thickness of the tread portion 1 to the thickness of the sealant layer 10 in an appropriate range is advantageous in suppressing the deformation or flow of the sealant layer 10 during travel.

Here, when the ratio S1/T1 is 0.15 or less, the sealant layer 10 is too thin, and thus sufficiently ensuring the sealing properties is difficult. When the ratio S1/T1 is 0.35 or more, the sealant layer 10 is too thick, and thus there is a concern that the weight of the sealant layer 10 (the amount of the sealant used) increases, increasing rolling resistance, or decreasing uniformity. When the ratio S2/T2 is 0.20 or less, the sealant layer 10 is too thin, and thus sufficiently ensuring the sealing properties is difficult. When the ratio S2/T2 is 0.40 or more, the sealant layer 10 is too thick, and thus there is a concern that the weight of the sealant layer 10 (the amount of the sealant used) increases, increasing rolling resistance, or decreasing uniformity.

In a typical pneumatic tire, the thickness of the tread portion 1 tends to gradually decrease from the tire equator CL toward the outer side in the tire width direction. That is, the thicknesses T1 and T2 often have the relationship T1>T2. Therefore, in setting the above-described relationships of the ratio S1/T1, the ratio S2/T2 in consideration of the change in thickness of the tread portion 1 in the width direction, preferably, the thickness of the sealant layer 10 is uniform over the entire region in the tire width direction to satisfy the above-described ranges. By making the thickness of the sealant layer 10 uniform as described above, excellent sealing properties can be exhibited in the entire region in the tire width direction. On the other hand, even when the thickness of the sealant layer 10 is uniform, the relationships of the ratio S1/T1, the ratio S2/T2 described above can be satisfied, and thus deformation and flow of the sealant can also be effectively suppressed.

The sealant layer 10 is constituted by the adhesive sealant as described above, and from the viewpoint of suppressing rolling resistance, tan δ at 60° C. of the adhesive sealant is preferably 1.0 or less, and more preferably from 0.2 to 0.7. Setting the tan δ in this manner improves the physical properties of the adhesive sealant, advantageously suppressing an increase in rolling resistance in providing the adhesive sealant on the tire inner surface as the sealant layer 10. Here, when the tan δ at 60° C. of the adhesive sealant exceeds 1.0, the effect of suppressing rolling resistance to a low level cannot be sufficiently expected.

The sealant composition constituting the adhesive sealant (hereinafter, referred to as sealant composition of an embodiment of the present technology) has characteristics of a proportion A of toluene insoluble represented by Formula (1) below preferably ranging from 30 mass % to 60 mass % and more preferably from 35 mass % to 50 mass %.

$$A=(W2/W1)\times100 \tag{1}$$

where W2 is a mass (unit: g) of toluene insoluble remaining after immersion of the sealant composition in toluene for one week, and W1 is an initial mass (unit: g) before immersion of the sealant composition in toluene).

The sealant composition having such characteristics can ensure good sealing properties while suppressing a flow of the sealant during travel and provide such performance in a well-balanced, compatible manner. Specifically, the proportion A of the toluene insoluble ranges from 30 mass % to 60 mass %, and accordingly, adequate crosslinking density can be achieved, and suitable physical properties (low fluidity and excellent sealing properties) as the sealant material can be ensured. When the proportion A of the toluene insoluble is less than 30 mass %, crosslinking density becomes low, failing to sufficiently obtain the effect of suppressing flow. When the proportion A of the toluene insoluble component exceeds 60 mass %, crosslinking density becomes excessively high, and thus sealing properties may decrease.

As long as the sealant composition of an embodiment of the present technology has the characteristics described above, a specific blend of the sealant composition is not particularly limited. However, to reliably obtain the characteristics described above, for example, a blend described below is preferably employed.

In the sealant composition of an embodiment of the present technology, a rubber component may include butyl rubber. A proportion of the butyl rubber occupying the rubber component is preferably 10 mass % or more, and more preferably from 20 mass % to 90 mass %. Good adhesiveness with respect to the tire inner surface can be ensured by including the butyl rubber in this manner. When the proportion of the butyl rubber is less than 10 mass %, adhesiveness with respect to the tire inner surface cannot be ensured sufficiently.

The sealant composition of an embodiment of the present technology preferably includes, as the butyl rubber, halogenated butyl rubber. Examples of the halogenated butyl rubber include chlorinated butyl rubber and brominated butyl rubber, and particularly, chlorinated butyl rubber can be used suitably. In a case where chlorinated butyl rubber is used, a proportion of the chlorinated butyl rubber occupying 100 mass % of the rubber component is preferably 5 mass % or more, and more preferably from 10 mass % to 85 mass %. Reactivity of the rubber component and a crosslinking agent or an organic peroxide described below increases by including the halogenated butyl rubber (chlorinated butyl rubber), and this is advantageous in that ensuring of sealing properties and suppression of a flow of the sealant are provided in a compatible manner. Additionally, the processability of the sealant composition can also improve. When the proportion of the chlorinated butyl rubber is less than 5 mass %, reactivity of the rubber component and the crosslinking agent or the organic peroxide described below does not improve sufficiently, and a desired effect cannot be obtained sufficiently.

In the sealant composition of an embodiment of the present technology, not all the butyl rubber is required to be the halogenated butyl rubber (chlorinated butyl rubber), and non-halogenated butyl rubber can also be used in combination. Examples of the non-halogenated butyl rubber include unmodified butyl rubber normally used in a sealant composition, such as BUTYL-065 available from JSR Corporation, and BUTYL-301 available from LANXESS AG. In a case where the halogenated butyl rubber and the non-halogenated butyl rubber are used in combination, a blended amount of the non-halogenated butyl rubber may be preferably less than 20 mass %, and more preferably less than 10 mass % per 100 mass % of the rubber component. In the sealant composition of an embodiment of the present technology, two or more types of rubber are preferably used in combination as the butyl rubber. That is, other type of halogenated butyl rubber (for example, brominated butyl rubber) or the non-halogenated butyl rubber is preferably used in combination with respect to the chlorinated butyl rubber. The three types of the chlorinated butyl rubber, other type of halogenated butyl rubber (brominated butyl rubber), and the non-halogenated butyl rubber mutually differ in a vulcanization rate, and thus, when at least the two types are used in combination, the physical properties (viscosity, elasticity, and the like) of the sealant composition obtained after vulcanization do not become uniform due to a difference in the vulcanization rate. That is, due to a distribution (variation in concentration) of rubber differing in a vulcanization rate in the sealant composition, a relatively hard portion and a relatively soft portion are mixed in the sealant layer obtained after vulcanization. As a result, fluidity is suppressed in the relatively hard portion and sealing properties are exhibited in the relatively soft portion, advantageously providing such performance in a well-balanced, compatible manner.

In the sealant composition of an embodiment of the present technology, other diene rubber than the butyl rubber can also be blended as the rubber component. As other diene rubber, rubber that is generally used in a sealant composition, such as natural rubber (NR), isoprene rubber (IR), butadiene rubber (BR), styrene butadiene rubber (SBR), styrene isoprene butadiene rubber (SIBR), ethylene propylene diene rubber (EPDM), chloroprene rubber (CR), and acrylonitrile butadiene rubber (NBR) can be used. The other diene rubber may be used alone or as a freely chosen blend.

In the sealant composition of an embodiment of the present technology, a crosslinking agent is preferably blended. Note that "crosslinking agent" in an embodiment of the present technology refers to a crosslinking agent excluding an organic peroxide, and examples of the crosslinking agent include sulfur, zinc oxide, cyclic sulfide, a resin (resin vulcanization), and amine (amine vulcanization). As the crosslinking agent, a crosslinking agent including a sulfur component (for example, sulfur) is preferably used. The crosslinking agent is blended in this manner, and accordingly, adequate crosslinking for providing ensuring of sealing properties and prevention of a flow of the sealant in a compatible manner can be realized. A blended amount of the crosslinking agent is preferably from 0.1 parts by mass to 40 parts by mass, and more preferably from 0.5 parts by mass to 20 parts by mass per 100 parts by mass of the rubber component described above. When the blended amount of the crosslinking agent is less than 0.1 parts by mass, the blended amount of the crosslinking agent is identical to a blended amount in the case of including substantially no crosslinking agent, and appropriate crosslinking cannot be performed. When the blended amount of the crosslinking agent exceeds 40 parts by mass, crosslinking of the sealant composition excessively proceeds, and sealing properties decrease.

In the sealant composition of an embodiment of the present technology, the crosslinking agent described above is not used alone, but is preferably used in combination with an organic peroxide. The crosslinking agent and the organic peroxide are used in combination and are blended in this manner, and accordingly, adequate crosslinking for providing ensuring of sealing properties and prevention of a flow of the sealant in a compatible manner can be realized. A blended amount of the organic peroxide is preferably from 1 part by mass to parts by mass, and more preferably from 1.0 part by mass to 20 parts by mass per 100 parts by mass of the rubber component described above. When the blended amount of the organic peroxide is less than 1 part by mass, the blended amount of the organic peroxide is excessively small, and crosslinking cannot be performed sufficiently, and desired physical properties cannot be obtained. When the blended amount of the organic peroxide exceeds 40 parts by mass, crosslinking of the sealant composition excessively proceeds, and sealing properties decrease.

When the crosslinking agent and the organic peroxide are used in combination in this manner, a mass ratio A/B of a blended amount A of the crosslinking agent to a blended amount B of the organic peroxide may be preferably from 5/1 to 1/200, and more preferably from 1/10 to 1/20. According to such a blending proportion, ensuring of sealing properties and prevention of a flow of the sealant can be provided in a better-balanced, compatible manner.

Examples of the organic peroxide include dicumyl peroxide, t-butyl cumyl peroxide, benzoyl peroxide, dibenzoyl peroxide, butyl hydroperoxide, p-chlorobenzoyl peroxide, and 1,1,3,3-tetramethylbutyl hydroperoxide. Particularly, an organic peroxide having a one-minute half-life temperature of from 100° C. to 200° C. is preferable, and among the specific examples described above, dicumyl peroxide and t-butyl cumyl peroxide are particularly preferable. Note that in an embodiment of the present technology, as "one-minute half-life temperature," generally, a value described in the "Organic Peroxide Catalog No. 10 Ed." from Nippon Oil & Fats Co., Ltd. is employed, and in a case where a value is not described, a value determined from thermal decomposition in an organic solvent by a method identical to a method described in the catalog is employed.

In the sealant composition of an embodiment of the present technology, a crosslinking aid is preferably blended. Crosslinking aid refers to a compound that acts as a crosslinking reaction catalyst by blending the compound with the crosslinking agent including the sulfur component. The cross linking agent and the crosslinking aid are blended, and accordingly, the vulcanization rate can be increased, and the productivity of the sealant composition can be enhanced. A blended amount of the crosslinking aid is preferably more than 0 parts by mass and less than 1 part by mass, and more preferably from 0.1 parts by mass to 0.9 parts by mass per 100 parts by mass of the rubber component described above. The blended amount of the crosslinking aid is reduced in this manner, and accordingly, degradation (heat degradation) of the sealant composition can be suppressed while promoting crosslinking reaction as a catalyst. When the blended amount of the crosslinking aid is 1 part by mass or more, the effect of suppressing heat degradation cannot be obtained sufficiently. Note that crosslinking aid is a crosslinking aid that acts as a crosslinking reaction catalyst by blending the crosslinking aid with the crosslinking agent including the sulfur component as described above, and thus, when the crosslinking aid coexists with an organic peroxide instead of the sulfur component, the effect as a crosslinking reaction catalyst cannot be obtained, and a large content of the crosslinking aid needs to be used, and heat degradation is promoted.

The blended amount of the crosslinking agent may be preferably from 50 mass % to 400 mass %, and more preferably from 100 mass % to 200 mass % of the blended amount of the crosslinking aid described above. The cross-linking agent and the crosslinking aid are blended in this manner and in a well-balanced manner, and accordingly, a good function of the crosslinking aid as a catalyst can be exhibited, and this is advantageous in that ensuring of sealing properties and prevention of a flow of the sealant are provided in a compatible manner. When the blended amount of the crosslinking agent is less than 50 mass % of the blended amount of the crosslinking aid, fluidity decreases. When the blended amount of the crosslinking agent exceeds 400 mass % of the blended amount of the crosslinking aid, deterioration resistance performance decreases.

Examples of the crosslinking aid include sulfenamide-based, thiazole-based, thiuram-based, thiourea-based, gua-nidine-based, dithiocarbamate-based, aldehyde-amine-based, aldehyde-ammonia-based, imidazoline-based, and xanthogen-based compounds (vulcanization accelerators). Among these, thiazole-based, thiuram-based, guanidine-based, and dithiocarbamate-based vulcanization accelerators can be used suitably. Examples of the thiazole-based vul-canization accelerator include 2-mercaptobenzothiazole, and dibenzothiazyl disulfide. Examples of the thiuram-based vulcanization accelerator include tetramethylthiuram mono-sulfide, and tetramethylthiuram disulfide. Examples of the guanidine-based vulcanization accelerator include diphe-nylguanidine, and di-ortho-tolylguanidine. Examples of the dithiocarbamate-based vulcanization accelerator include sodium dimethyldithiocarbamate, and sodium diethyldithio-carbamate. Particularly, in an embodiment of the present technology, thiazole-based or thiuram-based vulcanization accelerators are preferably used, and variation in the per-formance of the sealant composition obtained can be sup-pressed.

Note that, for example, a compound such as quinone dioxime that actually functions as the crosslinking agent may be referred to as the crosslinking aid for the sake of convenience, but crosslinking aid in an embodiment of the present technology is a compound functioning as a catalyst of crosslinking reaction using the crosslinking agent as described above, and thus, the quinone dioxime does not correspond to the crosslinking aid in an embodiment of the present technology.

The sealant composition of an embodiment of the present technology is preferably blended with a liquid polymer. The liquid polymer is blended in this manner, and accordingly, the viscosity of the sealant composition can be enhanced, and sealing properties can improve. A blended amount of the liquid polymer is preferably from 50 parts by mass to 400 parts by mass, and more preferably from 70 parts by mass to 200 parts by mass per 100 parts by mass of the rubber component described above. When the blended amount of the liquid polymer is less than 50 parts by mass, the effect of enhancing the viscosity of the sealant composition cannot be obtained sufficiently. When the blended amount of the liquid polymer exceeds 400 parts by mass, a flow of the sealant cannot be prevented sufficiently.

The liquid polymer is preferably co-crosslinkable with the rubber component (butyl rubber) in the sealant composition, and examples of the liquid polymer include paraffin oil, polybutene oil, polyisoprene oil, polybutadiene oil, poly-isobutene oil, aroma oil, and polypropylene glycol. From the perspective of reducing the temperature dependency of the physical properties of the sealant composition and ensuring good sealing properties in low-temperature environments, among these, paraffin oil, polybutene oil, polyisoprene oil, polybutadiene oil, aroma oil, and polypropylene glycol are preferable, and particularly, paraffin oil is preferably used. Using paraffin oil advantageously sets viscosities at the temperatures described above to the respective appropriate ranges. Additionally, molecular weight of the liquid polymer is preferably 800 or more, more preferably 1000 or more, and even more preferably 1200 or more and 3000 or less. The liquid polymer having large molecular weight is used in this manner, and accordingly, a shift of an oil component from the sealant layer provided on the tire inner surface to a tire main body to affect the tire can be prevented.

The sealant composition including the blend described above contains at least the butyl rubber, and accordingly, crosslinking by using an adequate content of the crosslink-ing agent (preferably used in combination with the organic peroxide) while imparting high viscosity to the rubber component obtains adequate elasticity that does not cause a flow during travel while ensuring viscosity sufficient to obtain good sealing properties, and thus such performance can be provided in a well-balanced, compatible manner. Thus, the sealant material composition can be used suitably in the sealant layer 10 (sealant material) of the self-sealing type pneumatic tire, and the sealant material composition can ensure good sealing properties while suppressing a flow of the sealant during travel and provide such performance in a well-balanced, compatible manner.

An embodiment of the present technology will further be described below by way of Examples, but the scope of an embodiment of the present technology is not limited to Examples.

Example

Pneumatic tires (test tires) of Conventional Example 1, Comparative Examples 1 and 2, and Examples 1 to 11 were manufactured with a tire size of 235/55R18, a basic structure illustrated in FIGS. 1 and 2, and a sealant layer made of a sealant on the inner side in the tire radial direction of the inner liner layer in the tread portion, wherein a magnitude relationship between the actual ground contact width CW and the width SW of the sealant layer; a magnitude rela-tionship between the width SW of the sealant layer and the width BW1 of the inner belt layer; a magnitude relationship between the width SW of the sealant layer and the width BW2 of the outer belt layer; the vertical distance L along the tire radial direction between the tread surface at the tire equator position and the tread surface at the end portion of the actual ground contact region; the tan δ at 60° C. of the adhesive sealant; the ratio S1/T1 of the thickness T1 of the tread portion to the thickness S1 of the sealant layer at the tire equator position; the ratio S2/T2 of the thickness T2 of the tread portion to the thickness S2 of the sealant layer at the end portion position of the sealant layer; and a proportion A of toluene insoluble in the sealant composition; are set as shown in Table 1.

The tire mass, rolling resistance, sealing properties, and fluidity during travel of these test tires were evaluated by the following test methods, and the results are shown in Table 1.

Tire Mass

For mass of each test tire, the masses of four tires were measured, and an average value of the tires was calculated. The obtained results are shown on the "Tire mass" row of Table 1 as index values with an index value of Conventional Example 1 being 100. Higher index values indicate smaller tire mass.

Rolling Resistance

Each of the test tires was mounted on a wheel having a rim size of 18×7.5 J. Rolling resistance was measured in accordance with ISO (International Organization for Standardization) 28580 using a drum testing machine having a drum diameter of 1707.6 mm under the conditions of an air pressure of 230 kPa, a load of 4.82 kN, and a speed of 80 km/h. The evaluation results were shown on the "Rolling resistance" row in Table 1 as index values with an index value of Conventional Example 1 being 100 using reciprocals of measurement values. Larger index values indicate lower rolling resistance.

Sealing Properties

The test tires were mounted on wheels having a rim size of 18×7.5 J, and were mounted on a test vehicle, and at an initial air pressure of 230 kPa, a load of 8.5 kN, and a temperature of 23° C. (room temperature), a nail having a diameter of 5.0 mm was inserted into the tread portion, and then an air pressure of each of the tires left to stand for one hour in a state where the nail was removed was measured.

The evaluation results are indicated by the following four levels. Note that the evaluation result of "3" or "4" means exhibition of adequate sealing properties, and the case of "4" means exhibition of particularly excellent sealing properties.

4: Air pressure after leaving to stand is 240 kPa or more and 250 kPa or less

3: Air pressure after leaving to stand is 230 kPa or more and less than 240 kPa

2: Air pressure after leaving to stand is 200 kPa or more and less than 230 kPa

1: Air pressure after leaving to stand is less than 200 kPa

Fluidity of Sealant

The test tires were mounted on wheels having a rim size of 18×7.5 J, and mounted on a drum testing machine, and at an air pressure of 230 kPa, a load of 8.5 kN, and a travel speed of 80 km/h, travel for one hour was performed, and a flow state of the sealant after the travel was examined. In the evaluation results, lines of 20×40 squares each having a grid width of 5 mm are ruled in a surface of the sealant layer before the travel, and the number of the squares having a distorted shape after the travel is counted, and then, the case where no flow of the sealant is observed (the number of the distorted squares is 0) is indicated as "Good," the case where the number of the distorted squares is less than ¼ of the total number of the squares is indicated as "Pass," and the case where the number of the distorted squares is ¼ or more of the total number of the squares is indicated as "Fail."

TABLE 1

|  | Conventional Example 1 | Comparative Example 1 | Comparative Example 2 |
|---|---|---|---|
| Magnitude relationship between CW and SW | CW < SW | CW > SW | CW > SW |
| Magnitude relationship between SW and BW1 | SW > BW1 | SW < BW1 | SW < BW1 |
| Magnitude relationship between SW and BW2 | BW2 < SW | BW2 > SW | BW2 > SW |
| Vertical distance L mm | 12.0 | 12.0 | 10.0 |
| tan δ (60° C.) | 1.2 | 1.2 | 1.0 |
| Ratio S1/T1 | 0.35 | 0.35 | 0.25 |
| Ratio S2/T2 | 0.40 | 0.40 | 0.30 |
| Proportion A of toluene insoluble mass % | 20 | 20 | 30 |
| Tire mass index value | 100 | 106 | 107 |
| Rolling resistance index value | 100 | 106 | 109 |
| Sealing properties | 3 | 1 | 1 |
| Fluidity of sealant | Pass | Pass | Good |

|  | Example 1 | Example 2 | Example 3 | Example 4 |
|---|---|---|---|---|
| Magnitude relationship between CW and SW | CW < SW | CW < SW | CW = SW | CW < SW |
| Magnitude relationship between SW and BW1 | SW < BW1 | SW < BW1 | SW < BW1 | SW = BW1 |
| Magnitude relationship between SW and BW2 | BW2 < SW | BW2 < SW | BW2 = SW | BW2 < SW |
| Vertical distance L mm | 12.0 | 10.0 | 10.0 | 10.0 |
| tan δ (60° C.) | 1.2 | 1.0 | 1.0 | 1.0 |
| Ratio S1/T1 | 0.35 | 0.25 | 0.25 | 0.25 |
| Ratio S2/T2 | 0.40 | 0.30 | 0.30 | 0.30 |
| Proportion A of toluene insoluble mass % | 20 | 30 | 30 | 30 |
| Tire mass index value | 103 | 105 | 106 | 102 |
| Rolling resistance index value | 103 | 108 | 109 | 104 |
| Sealing properties | 3 | 4 | 3 | 4 |
| Fluidity of sealant | Pass | Good | Good | Good |

TABLE 2

| | Example 5 | Example 6 | Example 7 | Example 8 |
|---|---|---|---|---|
| Magnitude relationship between CW and SW | CW < SW | CW < SW | CW < SW | CW < SW |
| Magnitude relationship between SW and BW1 | SW < BW1 | SW < BW1 | SW < BW1 | SW < BW1 |
| Magnitude relationship between SW and BW2 | BW2 < SW | BW2 < SW | BW2 < SW | BW2 < SW |
| Vertical distance L mm | 12.0 | 8.0 | 10.0 | 10.0 |
| tan δ (60° C.) | 1.0 | 1.0 | 1.2 | 0.8 |
| Ratio S1/T1 | 0.25 | 0.25 | 0.25 | 0.25 |
| Ratio S2/T2 | 0.30 | 0.30 | 0.30 | 0.30 |
| Proportion A of toluene insoluble mass % | 30 | 30 | 30 | 30 |
| Tire mass index value | 105 | 105 | 105 | 105 |
| Rolling resistance index value | 108 | 108 | 105 | 109 |
| Sealing properties | 4 | 4 | 4 | 4 |
| Fluidity of sealant | Pass | Good | Pass | Good |

| | Example 9 | Example 10 | Example 11 |
|---|---|---|---|
| Magnitude relationship between CW and SW | CW < SW | CW < SW | CW < SW |
| Magnitude relationship between SW and BW1 | SW < BW1 | SW < BW1 | SW < BW1 |
| Magnitude relationship between SW and BW2 | BW2 < SW | BW2 < SW | BW2 < SW |
| Vertical distance L mm | 10.0 | 10.0 | 10.0 |
| tan δ (60° C.) | 1.0 | 1.0 | 1.0 |
| Ratio S1/T1 | 0.35 | 0.15 | 0.25 |
| Ratio S2/T2 | 0.40 | 0.20 | 0.30 |
| Proportion A of toluene insoluble mass % | 30 | 30 | 20 |
| Tire mass index value | 103 | 107 | 105 |
| Rolling resistance index value | 106 | 110 | 108 |
| Sealing properties | 4 | 3 | 4 |
| Fluidity of sealant | Pass | Good | Pass |

As can be seen from Tables 1 and 2, the pneumatic tires of Examples 1 to 11 each exhibited excellent sealing properties and suppressed flow of the sealant during travel while reducing the tire mass and rolling resistance compared to Conventional Example 1. On the other hand, in Comparative Examples 1 and 2, the width SW of the sealant layer is smaller than the actual ground contact width CW, and thus sufficient sealing properties could not be exhibited.

The invention claimed is:

1. A pneumatic tire, comprising:
a tread portion extending in a tire circumferential direction and having an annular shape;
a pair of sidewall portions respectively disposed on both sides of the tread portion;
a pair of bead portions each disposed on an inner side of a respective sidewall portion of the pair of sidewall portions in a tire radial direction;
a carcass layer mounted between the pair of bead portions;
at least one belt layer comprising an inner belt layer disposed adjacent to an outer circumferential side of the carcass layer in the tread portion; and
a sealant layer made of an adhesive sealant provided on at least an inner surface of the tread portion;
a width SW of the sealant layer, a width BW1 of the inner belt layer, and an actual ground contact width CW satisfying a relationship CW≤SW≤BW1;
a thickness T1 of the tread portion and a thickness S1 of the sealant layer at the tire equator position satisfying a relationship 0.15<S1/T1<0.35; and
a thickness T2 of the tread portion and a thickness S2 of the sealant layer at each end portion position of the sealant layer satisfying a relationship 0.20<S2/T2<0.40.

2. The pneumatic tire according to claim 1, wherein a vertical distance L along a tire radial direction between a tread surface at a tire equator position and a tread surface at each end portion of an actual ground contact region is 10.0 mm or less.

3. The pneumatic tire according to claim 1, wherein the adhesive sealant has a tan δ at 60° C. of 1.0 or less.

4. The pneumatic tire according to claim 1, wherein in a sealant composition constituting the adhesive sealant, a proportion A of toluene insoluble in the sealant composition expressed by A=(W2/W1)×100 ranges from 30 mass % to 60 mass %,
where W2 is a mass in grams of toluene insoluble remaining after immersion of the sealant composition in toluene for one week, and W1 is an initial mass in grams before immersion of the sealant composition in toluene.

5. The pneumatic tire according to claim 1, wherein, a sealant composition constituting the adhesive sealant comprises from 0.1 parts by mass to 40 parts by mass of a crosslinking agent blended per 100 parts by mass of rubber component.

6. The pneumatic tire according to claim 5, wherein the crosslinking agent comprises a sulfur component.

7. The pneumatic tire according to claim 5, wherein the rubber component comprises butyl rubber, and a blended amount of the butyl rubber per 100 mass % of the rubber component is 10 mass % or more.

8. The pneumatic tire according to claim 7, wherein the butyl rubber comprises chlorinated butyl rubber, and a blended amount of the chlorinated butyl rubber per 100 mass % of the rubber component is 5 mass % or more.

9. The pneumatic tire according to claim 5, wherein from 1 part by mass to 40 parts by mass of an organic peroxide and more than 0 parts by mass and less than 1 part by mass of a crosslinking aid are blended per 100 parts by mass of the rubber component.

10. The pneumatic tire according to claim 1, wherein the belt layer comprises, in addition to the inner belt layer, an outer belt layer disposed adjacent to an outer circumferential side of the inner belt layer, and the width SW of the sealant layer and a width BW2 of the outer belt layer satisfy a relationship BW2≤SW.

11. The pneumatic tire according to claim 10, wherein a vertical distance L along a tire radial direction between a tread surface at a tire equator position and a tread surface at each end portion of an actual ground contact region is 10.0 mm or less.

12. The pneumatic tire according to claim 11, wherein the adhesive sealant has a tan δ at 60° C. of 1.0 or less.

13. The pneumatic tire according to claim 12, wherein in a sealant composition constituting the adhesive sealant, a proportion A of toluene insoluble in the sealant composition expressed by A=(W2/W1)×100 ranges from 30 mass % to 60 mass %, where W2 is a mass in grams of toluene insoluble remaining after immersion of the sealant composition in toluene for one week, and W1 is an initial mass in grams before immersion of the sealant composition in toluene.

14. The pneumatic tire according to claim 13, wherein, the sealant composition constituting the adhesive sealant comprises from 0.1 parts by mass to 40 parts by mass of a crosslinking agent blended per 100 parts by mass of rubber component.

15. The pneumatic tire according to claim 14, wherein the crosslinking agent comprises a sulfur component.

16. The pneumatic tire according to claim 15, wherein the rubber component comprises butyl rubber, and a blended amount of the butyl rubber per 100 mass % of the rubber component is 10 mass % or more.

17. The pneumatic tire according to claim 16, wherein the butyl rubber comprises chlorinated butyl rubber, and a blended amount of the chlorinated butyl rubber per 100 mass % of the rubber component is 5 mass % or more.

18. The pneumatic tire according to claim 17, wherein from 1 part by mass to 40 parts by mass of an organic peroxide and more than 0 parts by mass and less than 1 part by mass of a crosslinking aid are blended per 100 parts by mass of the rubber component.

* * * * *